March 13, 1956     E. A. FUGLIE     2,738,158
NON-STICKING LEAK-PROOF VALVE
Filed June 22, 1953
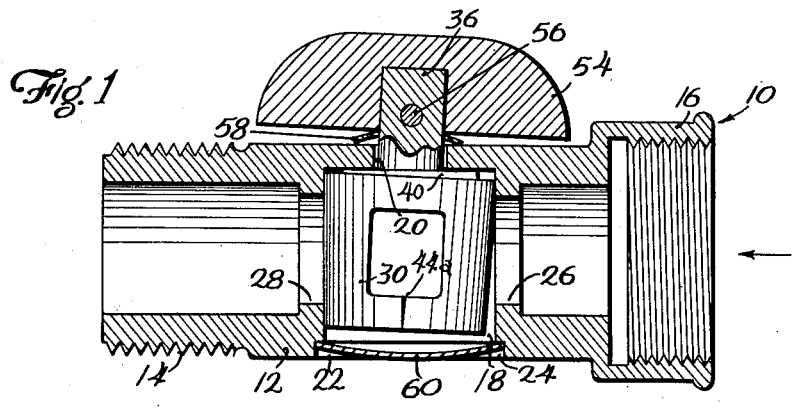
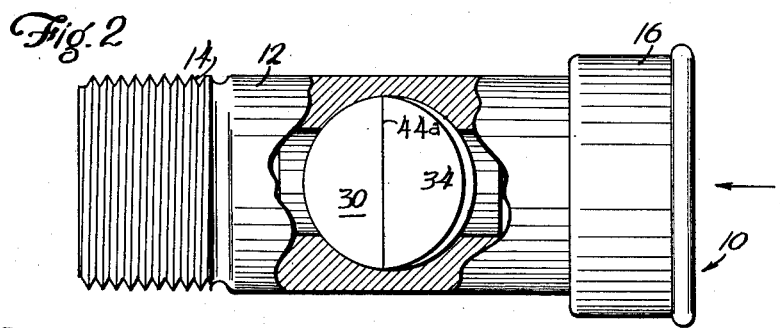
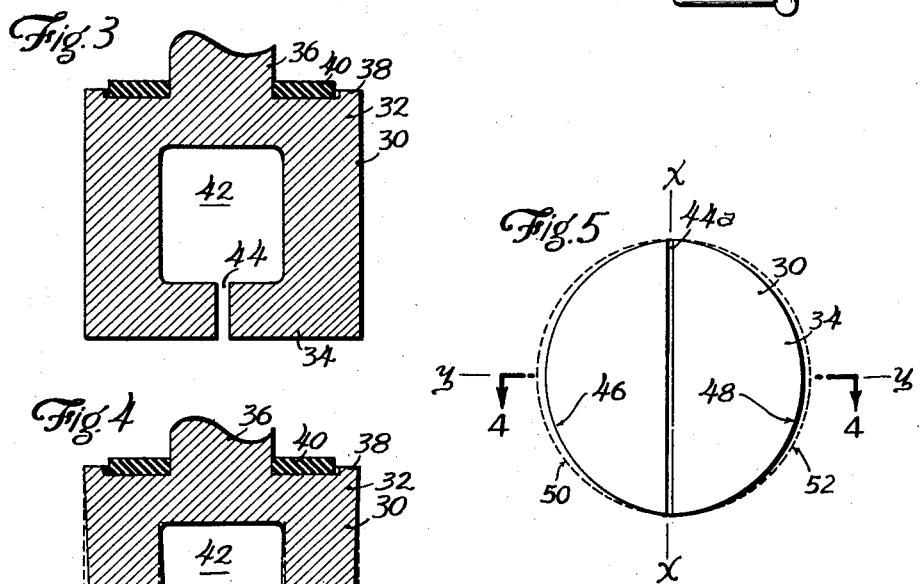
INVENTOR:
Elmer E. Fuglie
BY: Whiteley & Caine
ATTORNEYS United States Patent Office 2,738,158
Patented Mar. 13, 1956

2,738,158

NON-STICKING LEAK-PROOF VALVE

Elmer A. Fuglie, Winona, Minn., assignor to Winona Tool Manufacturing Company, a partnership Application June 22, 1953, Serial No. 363,101

2 Claims. (Cl. 251—309)

This invention relates to a non-sticking leakproof valve or stop cock. In general the valve may have large utility for controlling the flow of fluids under pressure, but it is particularly adapted for use in and about the household as between lengths of flexible hose or between a rigid metal conduit and a flexible conduit, to give a simple and inexpensive valve which is both internally and externally secure against leakage and which will not stick in its rotative movement because of the corrosive effect of materials carried by the fluid whose flow it controls.

In the construction of simple valves or stop cocks for controlling the flow of fluids under pressure, such as water, it is desirable to have a valve core which can be easily turned, but which when in a closed position is assured against internal leakage. In order to obtain a valve having these characteristics the internal parts have heretofore been made to closely interfit, but when so made are likely to stick to each other when even slightly corroded. This is particularly true of valves used on water, containing small amounts of alkali or derivatives of the alkaline earth metals. These materials either slightly attack the metals customarily used on valve parts or leave minute amounts of deposits on the parts which make the rotative closing and opening of a valve difficult.

It is also desirable with valves that have general utility about the household to so construct them against external leakage through moving parts, which creates an undesirable nuisance, and may require frequent repair.

In the present invention I have provided a relatively simple valve or stop cock composed of an outer casing having the usual inlet and outlet openings. Between these openings a cylindrical internal cavity is formed to receive the rotatable core. The core is originally formed as a cylinder and contains the usual transverse internal passage which on rotation controls the flow of fluid through the valve casing. The lower portion of the core, which is wholly contained within the valve body, has a kerf or cut therein which extends into the internal passage and removes a small amount of material from the bottom portion of the core. The kerf is closed by squeezing or pinching the lower portion of the core so that the material on either side of the kerf is permanently compressed inwardly to occupy the space formed by the kerf thereby creating a core which is cylindrical on its outer surface so as to give a true coincidence with the cylindrical surface of the cavity, and yet allow a slight amount of freedom of lateral movement of the core relative to the cavity. In order that this movement be made possible, a stem which extends from the upper end of the core is of substantially smaller diameter than the core and penetrates a part of the valve casing between the inlet and outlet openings. An annular gasket surrounds the stem and provides a sealing surface even though the core may be slightly tilted as resulting from the pinched effect on the lower end of the core. A suitable valve handle is secured to the outer end of the stem to provide control of the valve core. The valve casing is provided with a large lower opening to permit insertion of the core into the cylindrical cavity, and a suitable fluid-tight seal which is independent of the core seals this opening after the core has been inserted into the cavity.

This application is a continuation in part of my prior application Serial No. 34,000 filed June 19, 1948.

An object of the invention is to provide a simple non-sticking leak-proof valve.

Another object is to provide in a simple valve or stop cock, a valve body containing a cylindrical cavity and a core formed as a cylinder containing a transverse central passage with a kerf or cut formed in the core communicating with the passage, which is subject to deformation by having the material on the opposite sides of the kerf permanently pressed inwardly to change one extremity of the core from a true cylinder to an elliptical shape but with true cylindrical lateral surfaces that cooperate with the cylindrical surface on one side of the cavity to form a sealing surface between the core and the cavity.

A further object is to provide a valve or stop cock including a valve body having a cylindrical cavity formed therein within which is mounted a core whose lateral surface is formed as a cylinder, and containing a kerf or cut in one end which permits the material on opposite sides of the kerf to be permanently depressed inwardly to give a certain freedom of movement of the core with respect to the cavity, but with true cylindrical surfaces on the sides thereof for sealing purposes, together with means for satisfactorily sealing the core within the cavity to prevent external leakage of fluid through the casing portion of the valve.

Other and further objects may become apparent from the following description and claims and in the appended drawings in which:

Fig. 1 is a vertical section through a valve or stop cock forming the present invention with the position of certain parts shown in an exaggerated scale;

Fig. 2 is a bottom plan view of the valve shown in Fig. 1 with a plug type closure removed so as to show the interior of the valve, and with certain parts of the body broken away;

Fig. 3 is an elevation of the core structure as originally formed;

Fig. 4 is a vertical section taken on line 4—4 of Fig. 5, and showing a portion of a slightly deformed core structure; and Fig. 5 is a bottom plan view of the deformed core structure shown in Fig. 4.

Referring now to the several views of the drawing, the invention will be described in detail.

General reference numeral 10 indicates a valve or stop cock which in the present illustration is particularly suited for use in conjunction with a household garden hose or the like, but may be adapted for general use in controlling the flow of any fluid. The valve 10 consists of a casing or body member 12 which has a threaded nipple 14 integrally connected at one end and an internally threaded coupling 16 integrally connected at the other end. While the coupling 16 forms a permanent part of the valve casing, it could, if desired, be loosely connected therewith, and in place of the connecting members 14 and 16, any other suitable means may be used for coupling the valve between two conduits or fittings. Within the interior of casing 12 is a vertical cavity 18 which is formed as a substantially true cylinder. Extending from cavity 18 through the upper side of the body, as shown in Fig. 1, is a smaller connecting passage 20. Extending from the lower portion of cavity 18 is a wider opening 22 having a wider shallow portion 24 surrounding the outer end of the opening. The casing 12 is provided with an inlet opening 26 and an outlet opening 28 which are oppositely disposed with respect to each other and communicate with the central cylindrical cavity 18.

Within the interior of cavity 18 and as best seen in Fig. 3, is a core 30 which is formed as a substantially true cylinder having a top end 32 and a bottom end 34. Extending axially from the top end 32 is a stem portion 36 that is adapted to penetrate the opening 20 in casing 12. An annular collar 38 is formed about the periphery of the top end 32 and interior of the collar 38 and in surrounding relationship to the stem 36 is a resilient gasket 40. Within the interior of the core 30 is formed a passage 42 which extends transversely to the axis of the core, and is adapted to form communication between the inlet 26 and the outlet 28 of casing 12. Within the bottom 34 of core 30 is formed a transverse kerf 44 which extends in the same plane as the transverse passage 42 and in a plane parallel with the axis of passage 42. The purpose of kerf 44 is to materially weaken the bottom surface 34 of the core so as to form a closed kerf 44a by permanently depressing or squeezing the sides 46, 48.

By referring to Fig. 5 the effect of forming a core as a substantially true cylinder and providing a kerf which has been pinched together as indicated at 44a, produces what I prefer to term an elliptical shape on the bottom end of the core with the major axis of the so-called ellipse being common with the kerf and therefore common with the axis of the transverse passage 42. The true cylindrical shape of the core is indicated by the outer dotted lines 50, 52, and would indicate the shape of the top end of the core while reference characters 46, 48 indicate the elliptical effect on the bottom of the core. It will be noted that on the major axis indicated at x—x the curves 46, 48, 50 and 52 all meet, whereas on the minor axis indicated at y—y the curves 46, 48 fit within the curves 50, 52, but the outer surface of the curves 46 and 48, having been originally formed on a true cylindrical axis, are themselves cylindrical in configuration and serve a highly important function in this invention, as will be explained hereinafter.

Referring now to Fig. 1, on the outer end of the stem 36 is a handle 54 which is secured to the stem by a pin or set screw indicated at 56. Between the upper surface of casing 12 and the lower surface of handle 54 is an annular spring washer indicated at 58.

The core 30 containing its gasket 40 is projected into the cavity 18 through the large opening 22 in the lower surface of the casing and a circular Welch plug 60 is placed in the shallow opening 24 and forms a permanent seal over the opening 22.

The general purpose of this invention, as set forth previously, is to provide a relatively simple valve or stop cock principally for household use, but it should be understood that it has general utility particularly for controlling the flow of liquids under pressure. The valve is of such simple construction that it is believed that its manufacture and assembly can be well understood by those skilled in the art from the drawings and the foregoing explanation. Of particular importance, however, is that the cavity 18 is substantially cylindrical in configuration and the core 30 may be best made by originally forming it as a substantially true cylinder.

A preferred way of constructing the core is, after the formation of kerf 44, to compress the sides of the core as in the manner shown in Figs. 4 and 5, so as to give what amounts to an elliptical shape to the bottom end of the core. While this shape might be accomplished by means other than the formation of the kerf, such a means forms a very practical manner of giving the elliptical shape to the bottom end of the core with substantially true outer cylindrical surfaces. The appearance of the core in Figs. 1–4 has been greatly exaggerated to clearly show the effect of the elliptical shape. In actual practice the lower end of the core has a freedom of movement in the range of one or two thousandths of an inch on the minor axis y—y, which is sufficient to prevent sticking of the core with respect to the cavity by virtue of corrosive materials, and yet present a substantially true cylindrical surface on either side of the core which will closely interfit the cylindrical surface of the cavity 18 adjacent the outlet opening 28. Gasket 40 is of sufficient thickness to prevent leakage through the small opening 20 around the stem 36 and spring 58, acting between the handle and the casing, will normally hold the valve in a properly centered position, except when fluid under pressure, indicated by the arrows in Figs. 1 and 2 is present in the inlet opening and will cause tilting of the core against the outlet opening 28, as shown.

The principal advantage of this invention is in providing a simple non-sticking leak-proof valve of the fewest possible parts. Spring 58 and washer 40 are sufficient to prevent any external leakage about the stem, and the plug 60 which is in no way connected to the core 30 prevents external leakage through the bottom of the valve. The valve is internally secure against sticking and leakage because of the slightly elliptical shape of the bottom end of the core which as formed is capable of sealing against leakage on the major axis x—x, and prevents leakage through the outlet opening because of the true cylindrical surfaces on the sides of the core which are transverse to the central passage 42.

My invention is defined in the terms of the appended claims.

I claim:

1. A valve, comprising a casing containing a central right circular cylindrical cavity, said casing containing a pair of oppositely disposed lateral openings communicating with the cavity and forming an inlet and an outlet, and a non-cylindrical core formed with top and bottom parallel ends rotatably positioned within said cavity with its axis of rotation passing through the centers of said top and bottom ends, a stem formed integral with the core and protruding through the casing, said core containing a central passage between its opposite ends extending transversely to the axis of rotation and adapted to form communication between the inlet and outlet openings in the casing, the lateral limits of the top end of said core formed as a true circle, the lateral limits of the bottom of said core permanently formed in an enclosed curve having a major and a minor axis of symmetry perpendicular to each other, said major axis parallel with the central passage through the core and of a length equal to the diameter of the top of the core, said minor axis being of a length less than the major axis, the outer surface of the core on either side of the major axis being a true semi-circle, the shape of said core permitting free rotative movement of the core relative to the cavity and with the curved interior surface of the cavity forming a sealing barrier between the inlet and the outlet when the passage is at right angles with said inlet and outlet in said casing.

2. A valve, comprising a casing containing a central right circular cylindrical cavity, said casing containing a pair of oppositely disposed lateral openings communicating with said central cavity forming an inlet and an outlet, and a non-cylindrical core having an enclosed curved surface bounded by top and bottom parallel ends, said core rotatably positioned within said cavity with its axis of rotation passing through the centers of said top and bottom ends, a stem formed integral with the core and protruding through the casing, said core containing a central passage between its opposite ends that extend transversely to the axis of rotation of the core and adapted to form communication between the inlet and the outlet openings in the casing, the lateral limits of the top end of said core formed as a substantially true circle, the bottom end of said core having a kerf formed therein that extends to the passage, the portions on opposite sides of the kerf permanently pressed toward each other so that the lateral limits of the bottom end of the core form a curve having a major and minor axis of symmetry perpendicular to each other, said major axis extending along the kerf and parallel with the central passage and of a length equal to the diameter of the top of the core, said minor axis being of a length less than the major axis, the outer surface of the core on either side of the kerf forming a true semi-circle permitting free rotative movement of the core relative to the cavity and with the curved interior surface of the cavity forming a sealing barrier between the inlet and the outlet when the passage is at right angles with said inlet and outlet.

References Cited in the file of this patent

UNITED STATES PATENTS

| | | |
|---|---|---|
| 329,809 | Buffet | Nov. 3, 1885 |
| 1,926,450 | MacGregor | Sept. 12, 1933 |

FOREIGN PATENTS

| | | |
|---|---|---|
| 581,192 | France | Nov. 24, 1924 |
| 124,984 | Great Britain | 1919 |